(12) United States Patent
Kanafani et al.

(10) Patent No.: US 6,843,167 B1
(45) Date of Patent: Jan. 18, 2005

(54) SYSTEM AND METHOD FOR PRODUCING PAR-BAKED PIZZA CRUSTS

(75) Inventors: Hanny Kanafani, Plano, TX (US); Ossama R. ElNakib, Arlington, TX (US); Staci L. Hayden, Dallas, TX (US); Michael A. Alagna, Palatine, IL (US); Jay E. Bauer, Oak Brook, IL (US); James L. Hilton, Hoffman Estates, IL (US)

(73) Assignee: Pizza Hut, Inc., Dallas, TX (US)

(*) Notice: Subject to any disclaimer, the term of this patent is extended or adjusted under 35 U.S.C. 154(b) by 0 days.

(21) Appl. No.: 09/539,454

(22) Filed: Mar. 30, 2000

Related U.S. Application Data
(60) Provisional application No. 60/172,237, filed on Apr. 13, 1999.

(51) Int. Cl.[7] .................. A21C 13/02; A21C 11/00; A21B 1/48
(52) U.S. Cl. .................. 99/349; 99/353; 99/427; 99/432; 99/443 C; 99/448
(58) Field of Search .................. 99/349, 353, 355, 99/356, 423, 427, 432, 439, 443 C, 448

(56) References Cited

U.S. PATENT DOCUMENTS

| | | | |
|---|---|---|---|
| 1,831,147 A | 11/1931 | Smith | 99/439 |
| 2,774,316 A | 12/1956 | Daino | 107/54 |
| 3,347,181 A | 10/1967 | Pizzo | 107/54 |
| 3,385,205 A | 5/1968 | McCloud | 99/439 |
| 3,814,005 A | 6/1974 | Widdel | 99/349 |
| 3,949,660 A | 4/1976 | Kuhlman | 99/352 |
| 4,046,920 A * | 9/1977 | Moline | 426/19 |
| 4,065,583 A | 12/1977 | Ahlgren | 426/243 |
| 4,100,308 A | 7/1978 | Gawrilow | 426/554 |
| 4,170,659 A | 10/1979 | Totino et al. | 426/95 |
| 4,173,942 A | 11/1979 | Plattner | 118/25 |
| 4,208,441 A * | 6/1980 | Westover | 426/293 |
| 4,251,549 A | 2/1981 | Fournet et al. | 426/19 |
| 4,265,919 A | 5/1981 | Munter et al. | 426/283 |
| 4,283,424 A | 8/1981 | Manoski et al. | 426/94 |
| 4,285,979 A | 8/1981 | Izzi | 426/94 |
| 4,303,677 A * | 12/1981 | De Acetis | 426/27 |
| 4,367,243 A * | 1/1983 | Brummett et al. | 426/303 |
| 4,379,055 A | 4/1983 | Carlson et al. | 210/400 |
| 4,400,404 A | 8/1983 | Persi | 426/549 |
| 4,464,405 A * | 8/1984 | De Christopher | 426/391 |
| 4,464,406 A | 8/1984 | Pierick | 426/496 |
| 4,500,276 A | 2/1985 | Cherkasky et al. | 425/297 |
| 4,539,213 A | 9/1985 | Cherkasky et al. | 426/512 |
| 4,606,923 A | 8/1986 | Ricke | 426/496 |
| 4,649,053 A | 3/1987 | Lamonica | 426/302 |
| 4,656,935 A | 4/1987 | Kukura | 99/426 |
| 4,661,361 A | 4/1987 | Mongiello et al. | 426/283 |
| 4,668,524 A | 5/1987 | Kirkpatrick | 426/502 |
| 4,696,823 A | 9/1987 | De Christopher | 426/496 |
| 4,749,581 A | 6/1988 | Gorsuch et al. | 426/505 |
| 4,769,252 A | 9/1988 | Escamilla | 426/496 |
| 4,842,882 A * | 6/1989 | Paulucci | 426/439 |

(List continued on next page.)

FOREIGN PATENT DOCUMENTS

| | | | |
|---|---|---|---|
| DE | 198 20 055 | 11/1999 | ............ A21D/8/00 |
| FR | 2 672 468 A1 | 8/1992 | ............ A21C/11/10 |
| GB | 2 228 661 A | 9/1990 | ............ A21D/8/00 |
| GB | 2228661 A * | 9/1990 | |
| GB | 2 289 431 A | 11/1995 | ............ A21B/3/13 |
| JP | 45-104 | 6/1970 | .................. 99/432 |

*Primary Examiner*—Drew Becker
(74) *Attorney, Agent, or Firm*—Baker Botts L.L.P.

(57) ABSTRACT

A system for producing par-baked pizza crusts from dough portions includes a pan adapted to support the dough portions. A lid assembly is positioned to contact each dough portion. The dough portions are par-baked in an oven, while the lid assembly contacts the dough portions, in order to produce par-baked pizza crusts.

17 Claims, 6 Drawing Sheets

U.S. PATENT DOCUMENTS

| | | | |
|---|---|---|---|
| 4,904,492 A | 2/1990 | Prigge | 426/523 |
| 4,905,581 A | 3/1990 | Kirkpatrick | 99/353 |
| 4,910,038 A | 3/1990 | Ducharme | 426/641 |
| 4,973,240 A | 11/1990 | Reilly | 425/195 |
| 5,009,867 A | 4/1991 | Kratochvil | 426/128 |
| 5,063,073 A | 11/1991 | Kratochvil | 426/573 |
| 5,074,777 A | 12/1991 | Garner | 425/289 |
| 5,074,778 A | 12/1991 | Betts, Jr. et al. | 425/394 |
| 5,149,556 A | 9/1992 | Le Viet et al. | 426/521 |
| 5,149,594 A * | 9/1992 | Lewandowski et al. | 426/503 |
| 5,154,115 A | 10/1992 | Kian | 99/380 |
| 5,176,922 A | 1/1993 | Balsano et al. | 425/89 |
| 5,200,216 A | 4/1993 | Barz et al. | 426/36 |
| 5,200,225 A | 4/1993 | Apaydin | 426/510 |
| 5,206,045 A | 4/1993 | Stuck | 426/243 |
| 5,207,151 A | 5/1993 | Le Viet et al. | 99/451 |
| 5,215,775 A | 6/1993 | Hoffman, Jr. | 426/418 |
| 5,234,700 A | 8/1993 | Barz et al. | 426/42 |
| 5,243,899 A | 9/1993 | Moshier et al. | 99/450.1 |
| 5,253,565 A | 10/1993 | Burton | 99/374 |
| 5,254,823 A | 10/1993 | McKee et al. | 219/10.55 R |
| 5,256,432 A | 10/1993 | McDonald et al. | 426/275 |
| 5,259,750 A | 11/1993 | Lewandowski et al. | 425/298 |
| 5,260,070 A | 11/1993 | Peleg | 426/94 |
| D343,627 S | 1/1994 | Raio | D15/135 |
| 5,308,640 A | 5/1994 | Baer et al. | 426/611 |
| 5,354,566 A | 10/1994 | Addesso et al. | 426/9 |
| 5,361,687 A | 11/1994 | deVries | 99/426 |
| 5,380,543 A | 1/1995 | Barz et al. | 426/582 |
| 5,400,698 A | 3/1995 | Savage | 99/439 |
| 5,405,626 A | 4/1995 | Van Der Graaf et al. | 426/94 |
| 5,405,627 A | 4/1995 | Ito | 426/94 |
| 5,409,367 A | 4/1995 | Lewandowski et al. | 425/298 |
| 5,417,149 A | 5/1995 | Raio et al. | 99/349 |
| 5,417,150 A | 5/1995 | Kordic | 99/432 |
| 5,434,390 A | 7/1995 | McKee et al. | 219/681 |
| 5,441,751 A | 8/1995 | Vagani | 426/27 |
| 5,465,654 A | 11/1995 | Lampi et al. | 99/422 |
| 5,484,618 A | 1/1996 | Barz et al. | 426/304 |
| 5,508,049 A | 4/1996 | Kordic | 426/94 |
| 5,510,135 A | 4/1996 | Galder | 426/512 |
| 5,514,402 A | 5/1996 | Williams | 426/496 |
| 5,526,735 A | 6/1996 | Hacker et al. | 99/432 |
| 5,536,162 A | 7/1996 | Juranovic et al. | 425/462 |
| 5,558,793 A | 9/1996 | McKee et al. | 219/391 |
| 5,591,470 A | 1/1997 | Bartley | 426/391 |
| 5,595,778 A | 1/1997 | Huang et al. | 426/556 |
| 5,620,731 A * | 4/1997 | McKee | 426/505 |
| 5,622,742 A * | 4/1997 | Carollo | 426/279 |
| 5,716,658 A | 2/1998 | Donnelly et al. | 426/420 |
| 5,750,170 A | 5/1998 | Daouse et al. | 426/283 |
| 5,756,137 A | 5/1998 | Viviano et al. | 426/94 |
| 5,775,208 A | 7/1998 | Kimple | 99/422 |
| 5,780,082 A | 7/1998 | Rebeaud | 426/94 |
| 5,789,009 A | 8/1998 | Kordic et al. | 426/391 |
| 5,800,844 A | 9/1998 | Raio et al. | 425/150 |
| 6,069,345 A | 5/2000 | Westerberg | 219/411 |
| 6,327,968 B1 * | 12/2001 | Scannell | 99/353 |

* cited by examiner

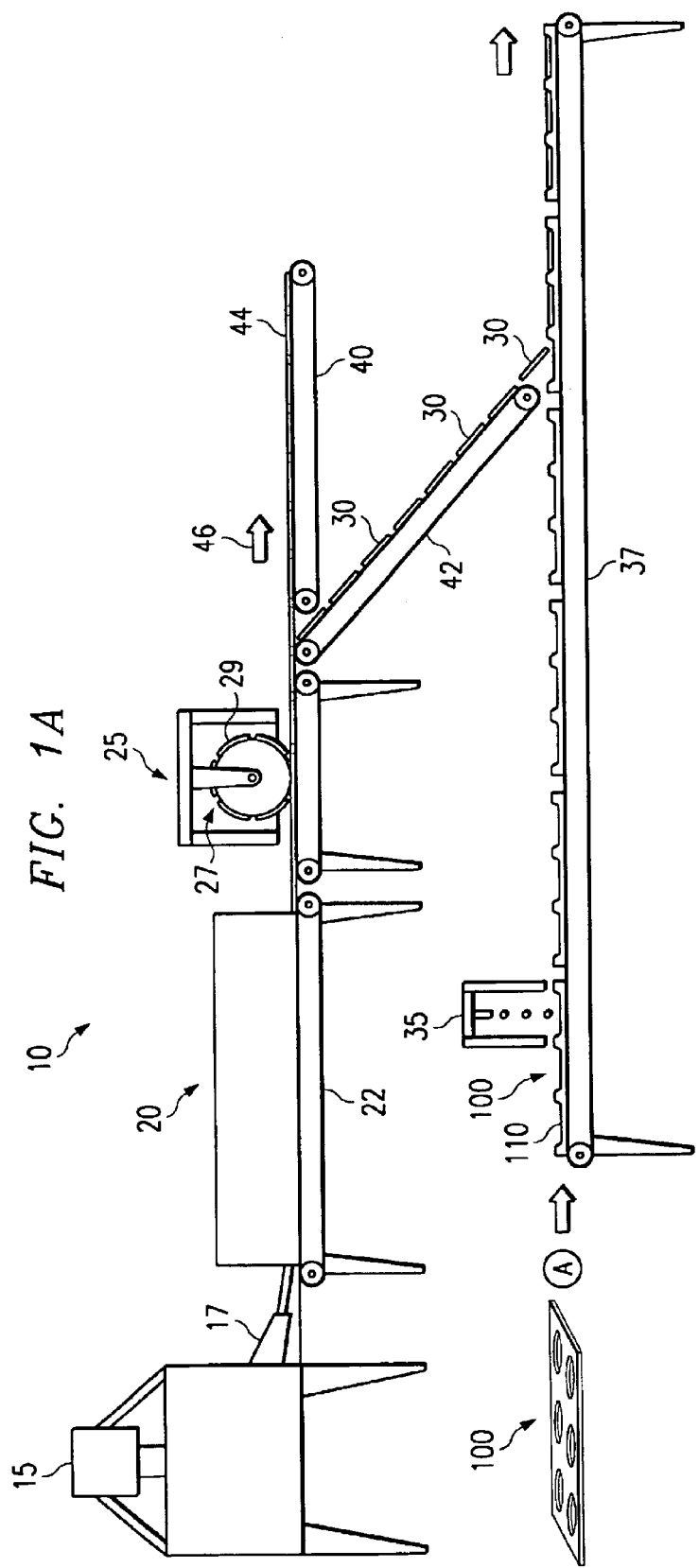

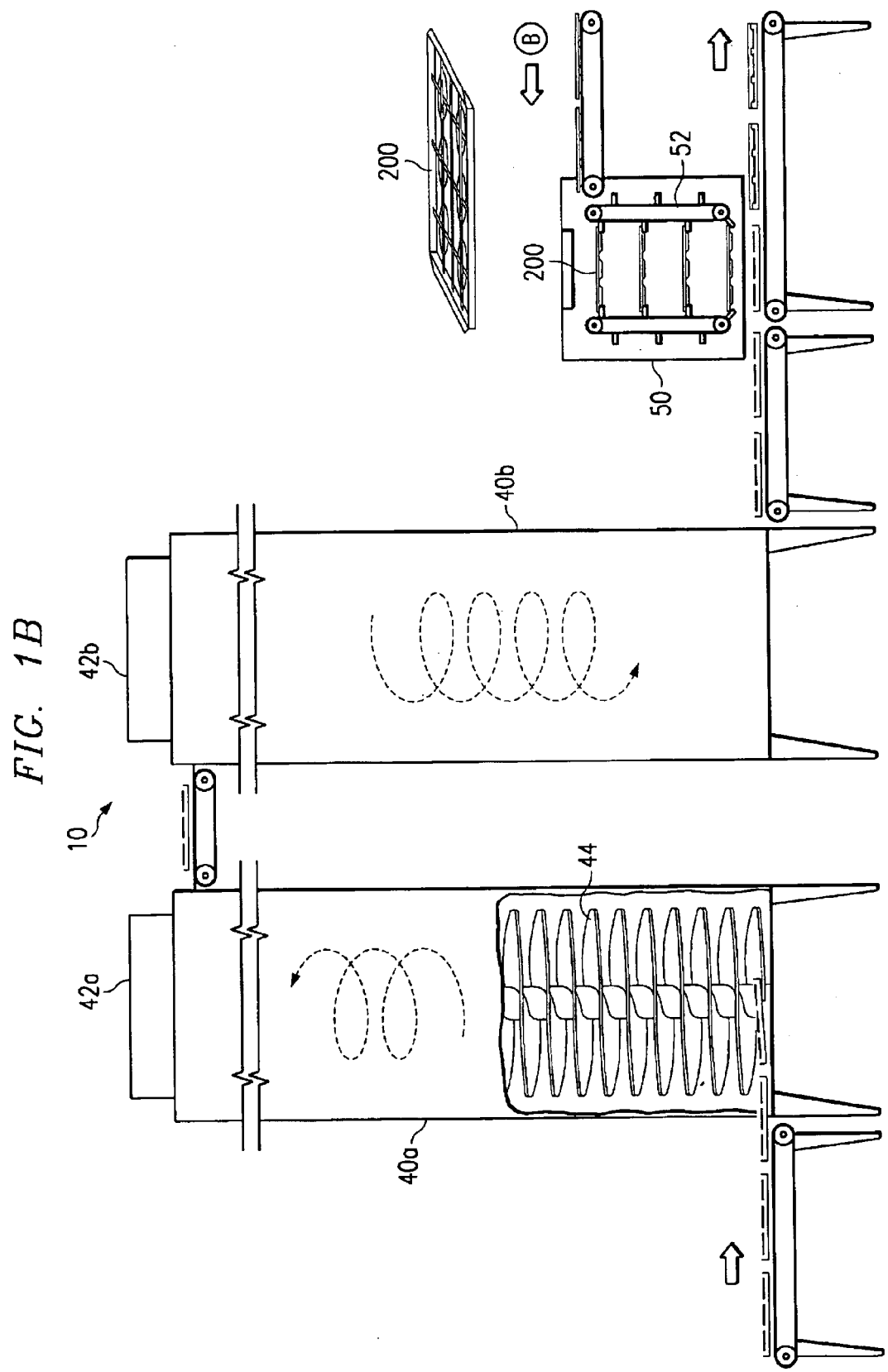

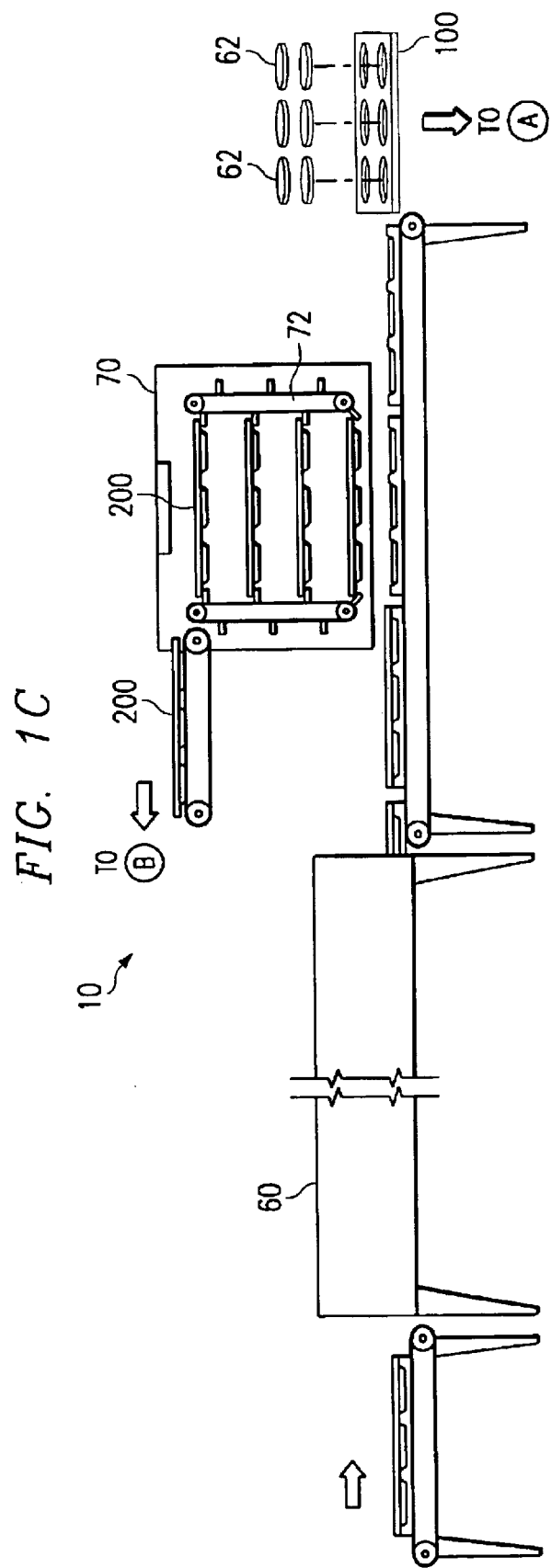

SYSTEM AND METHOD FOR PRODUCING PAR-BAKED PIZZA CRUSTS

CROSS REFERENCE TO RELATED APPLICATIONS

This application is related to U.S. application Ser. No. 09/527,802 entitled "System and Method for Producing Par-Baked Pizza Crusts," filed Mar. 17, 2000 by Stephen C. Scannell now U.S. Pat. No. 6,327,968.

CROSS REFERENCE TO RELATED APPLICATIONS

This application claims priority to U.S. Provisional Patent Application Ser. No. 60/172,237, filed on Apr. 13, 1999, entitled "System and Method for Producing Par-Baked Pizza Crusts.

TECHNICAL FIELD OF THE INVENTION

This invention relates to the field of pizza preparation and more particularly to a system and method for producing par-baked pizza crusts.

BACKGROUND OF THE INVENTION

Traditionally, pizzas have been made at restaurants by mixing dough ingredients, rolling and shaping the dough into a round disc, placing various toppings on the dough, and then baking the pizza to completion. However, in many restaurants, there is a need to produce pizza in a more timely fashion due to the high volume of pizza ordered and the customers' expectations of quick service. An alternate method that has been used to speed up the pizza-making process is to obtain frozen dough from a centralized source, thus eliminating the mixing step and reducing the time required to make the pizza in the restaurant.

Baking pizza crust dough from "scratch" or frozen dough requires a relatively long baking time. This is particularly true for certain specialty pizzas, such as deep-dish style pizzas. Furthermore, due to variances in the method by which the dough is formed, the resulting pizza crusts may have an inconsistent texture and taste. Moreover, when raw dough is made or when frozen dough is thawed, the dough must be used within a relatively short period of time.

SUMMARY OF THE INVENTION

Accordingly, a need has arisen for a type of pizza crust that may be pre-made and stored for a relatively long period of time. In addition, a need also exists for a method of partially cooking a pizza crust prior to a customer's order, so that the final cooking time after the order is received will be reduced. Moreover, a need has arisen for a process of baking a pizza crust that produces pizza crusts having a consistent form, texture, and taste. The present invention provides a system and method for producing par-baked pizza crusts that addresses shortcomings of prior systems and methods.

According to one embodiment of the invention, a system for producing par-baked pizza crusts includes a pan adapted to support a number of dough portions. A lid assembly is positioned to contact each dough portion. The system also includes an oven used to par-bake the dough portions, with the lid assembly contacting the dough portions, in order to produce par-baked pizza crusts.

In a particular embodiment, the system also includes a mixer that combines a number of ingredients to produce pizza crust dough. The dough may be bulk-proofed in a tub after the dough is mixed. A sheeter forms the dough into a sheet, and a cutter cuts the dough portions out of the sheet. Further, once the dough portions have been deposited on the pan, the system includes a proofer through which the pan travels to proof the dough portions. A lidding apparatus may also be included that positions the lid assembly on the pan after the pan exits the proofer, but before it goes into the oven.

Embodiments of the present invention provide numerous technical advantages. For example, par-baking a pizza crust according to one embodiment of the invention reduces the final cooking time that is required to cook a topped pizza crust. This advantage allows a restaurant serving pizzas to deliver its product more quickly to the consumer, and allows the restaurant to produce a higher quantity of pizzas. Furthermore, par-baking pizza crusts according to teachings of the present invention produces cost savings in equipment and labor due to the centralized production of the par-baked pizza crusts. Instead of each restaurant having to prepare and cook pizza crust dough from scratch, the dough can be prepared at a few central locations, par-baked at those locations, and then shipped to individual restaurants or consumers for later use. In addition, the present invention provides an automated system that enables the par-baked crusts to be mass-produced at these central locations.

Further advantages of the present invention include the ability to create pizza crusts that may be stored for longer periods of time than raw pizza dough, thus reducing the cost of wasted pizza dough. In addition, the use of a lid assembly incorporating teachings of the present invention in the par-baking process provides pizza crusts having a consistent and optimal form. One way that such a consistent form is achieved is through the use of alignment members that align the lid assemblies with their associated pans. In addition, a number of apertures are provided in lids of the lid assemblies to allow gases and moisture to escape from the crust that might otherwise cause the crust to have an undesirable form.

The use of such a lid assembly also provides an appropriate amount of heat and moisture transfer to and from the pizza crust to give the pizza crust a consistent, pleasing texture and taste. For example, the material from which the lids are fabricated may be used to control the amount of heat transfer to the crust. Furthermore, the present invention provides a system and method that produce a par-baked pizza crust that, when cooked a final time with toppings, tastes similar to or better than a pizza cooked in one step from raw dough with toppings.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which:

FIG. 1A is a schematic diagram showing a first portion of a system for producing par-baked pizza crusts according to teachings of the present invention;

FIG. 1B is a schematic diagram showing a second portion of the system for producing par-baked pizza crusts;

FIG. 1C is a schematic diagram showing a third portion of the system for producing par-baked pizza crusts;

DETAILED DESCRIPTION OF THE INVENTION

Figure 2:
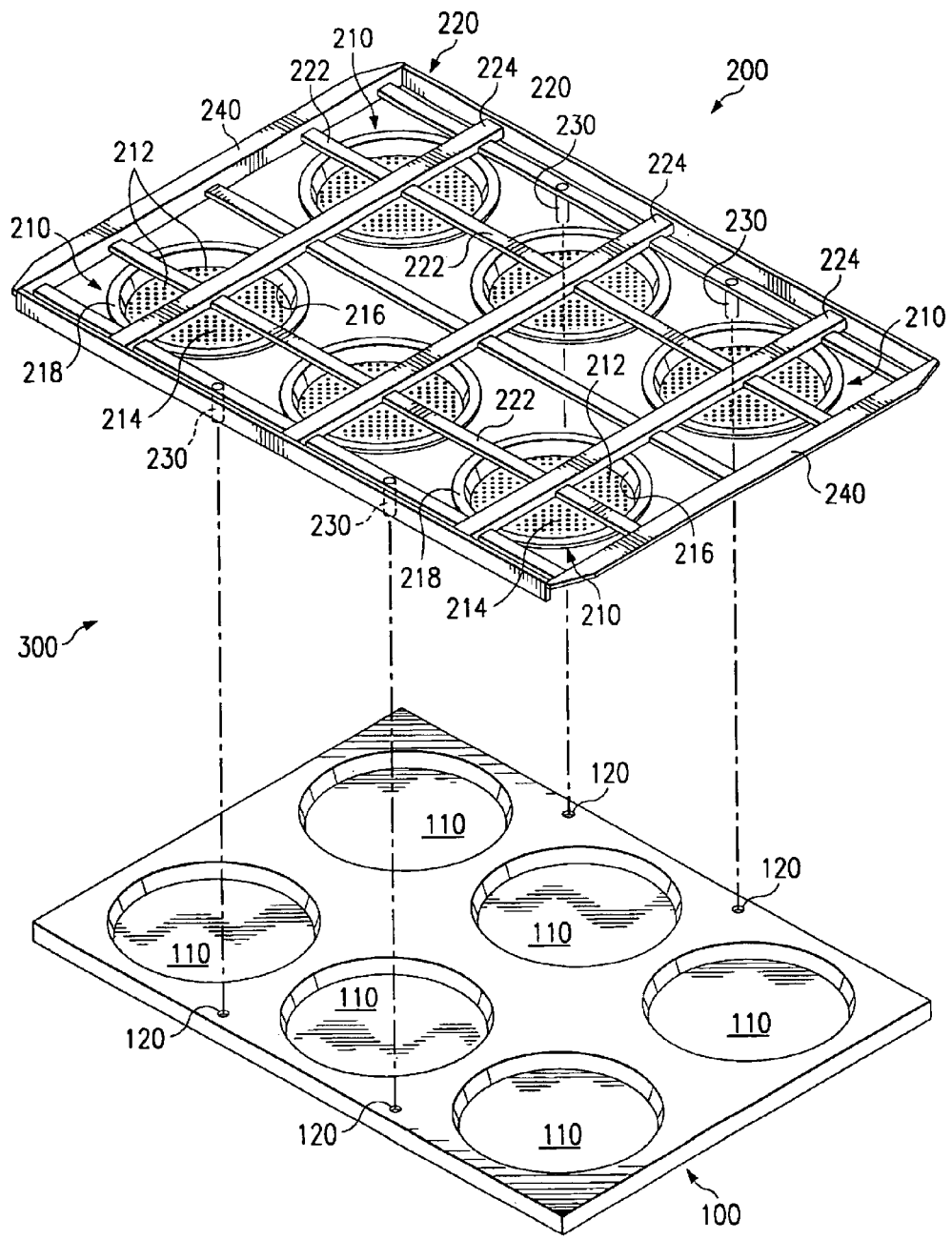
FIG. 2 is an isometric drawing of a lid assembly and a pan constructed according to teachings of the present invention.

Embodiments of the present invention and its advantages are best understood by referring to FIGS. 1A through 5 of the drawings, like numerals being used for like and corresponding parts of the various drawings.

FIGS. 1A–1C are schematic diagrams showing a system for producing par-baked pizza crust incorporating teachings of the present invention. Par-baking system 10 includes a number of different elements that operate together in an assembly line to increase the efficiency of the par-baking process. These elements are described below in conjunction with FIGS. 1A–1C.

FIG. 1A shows the first section of system 10. The assembly line of system 10 starts with a mixer 15. The various ingredients used to make the pizza crust dough are inserted into mixer 15, and mixer 15 combines the ingredients to form dough. The dough exits mixer 15 through an extruder 17. The extruded dough then enters a sheeter 20. Sheeter 20 forms the extruded dough into a flat sheet. In a particular embodiment, sheeter 20 includes a number of rollers. The dough passes between or under these rollers, and the rollers form the extruded dough into a sheet having a desired thickness. Successive rollers may be used to increasingly thin the sheet of dough.

Alternatively, the dough may be placed in a tub or container after leaving mixer 15, so that the dough may be bulk-proofed. Bulk-proofing at this stage has certain advantages that will be described in detail below. The bulk-proofing may last from fifteen to sixty minutes, depending on the length of a subsequent proofing, described below in conjunction with FIG. 1B. Once the dough is bulk-proofed, it is then extruded into sheeter 20.

Once the dough leaves sheeter 20, it is conveyed to a cutter 25. Cutter 25 cuts dough portions 30 out of the sheet of dough. Dough portions 30 may have any desired shape, such as a circle, a square, a rectangle or an oval. In the illustrated embodiment, cutter 25 comprises a cutter drum 27 which has a series of cutting forms 29. Cutting forms 29 cut dough portions 30 out of the sheet of dough, much like a cookie cutter cuts cookies. As the sheet of dough moves through cutter 25, cutter drum 27 rotates over the dough, and cutting forms 29 cut dough portions 30 out of the dough sheet. Typically, there will be more than one cutting form 29 disposed around the circumference of cutter drum 27. In addition, there will typically be multiple cutting forms 29 disposed along the width of cutter drum 27. Although a particular embodiment has been described, it will be understood that system 10 may employ any suitable method of sheeting the dough and cutting pizza crust shapes out of the sheet of dough. In addition, system 10 may include a mechanism that cuts the dough sheet into strips, and then separates these strips before they enter cutter 25. Because the strips are separated, cutting forms 29 may cut close to the edges of the strips, thus reducing the amount of dough left as webbing between the dough portions after cutting, but still leaving space between adjacently spaced dough portions.

Once the cut sheet of dough leaves cutter 25, a conveyor 40 pulls the sheet of dough over an opening leading to conveyor 42. As conveyor 40 pulls the sheet of dough over this opening, dough portions 30 fall into the opening and onto conveyor 42. Conveyor 40 pulls the remaining webbing 44 of the dough over the opening, and may return this webbing to an earlier point in system 10 for reuse, as indicated by arrow 46.

In a particular embodiment, a conveyer 37 moves a plurality of pans 100 under an oiler 35 that is located in a separate portion of system 10. As pans 100 (which are illustrated in cross-section) move under oiler 35, oiler 35 deposits a layer of oil in a plurality of recesses 110 located in each pan 100. This oil is later used to create a bottom fried surface on the par-baked pizza crusts. After being oiled, conveyor 37 moves pans 100 under conveyor 42, at which point dough portions 30 are each deposited into one of a plurality of recesses 110 located in pans 100. Alternatively, pans 100 may be conveyed under conveyor 42 without being oiled in this manner.

In system 10, the number of cutting forms 29 positioned along the width of cutter drum 27 (or the number of any other cutters used across the width of system 10) is equal to the number of recesses 110 located along the width of pans 100. The dimension referred to as width represents the dimension perpendicular to the plane of the page on which FIG. 1A is depicted. Similarly, the positioning between subsequent rows of dough portions 30 is equal to the spacing between subsequent rows of recesses 110 in pans 100. Therefore, there is a one-to-one correspondence of dough portions 30 that are cut and recesses 110 in which dough portions 30 are deposited.

Referring now to FIG. 1B, once conveyor 42 deposits dough portions 30 in pans 100, pans 100 are conveyed to a pair of proofers 40a and 40b. Environmental control units 42a and 42b control the temperature and humidity in proofers 40a and 40b, respectively. Environmental control units 42a and 42b condition the air inside proofers 40a and 40b to a temperature of approximately one hundred five degrees Fahrenheit and a humidity of approximately eighty-five percent. The conditions inside proofers 40a and 40b cause dough portions 30 in pans 100 to rise in preparation for par-baking.

In the illustrated embodiment, pans 100 containing dough portions 30 first enter proofer 40a. A lifting mechanism 44 conveys pans 100 from the bottom to the top of proofer 40a in a spiraling motion. Once pans 100 reach the top of proofer 40a, they are conveyed to proofer 40b. At this point, a lowering mechanism similar to lifting mechanism 44 conveys pans 100 from the top to the bottom of proofer 40b. Each pan 100 spends a total of approximately twenty to sixty minutes in proofers 40a and 40b. The total proofing time in proofers 40a and 40b depends on whether the dough was bulk-proofed after mixing.

In order to obtain a desired texture of the dough, the dough needs to be proofed for a selected period of time necessary to obtain that texture. The dough may be proofed for this selected period of time by bulk proofing, proofing in proofers 40a and 40b, or a combination of both. Thus, by initially bulk-proofing the dough, the total time required in proofers 40a and 40b is reduced. The less proofing time that is required in proofers 40a and 40b, the faster dough portions 30 can be run through proofers 40a and 40b. Therefore, through-put can be increased by using a bulk-proofing step. The length of proofing time required at each stage can vary greatly, but typical proofing times may include approximately forty-five minutes of bulk-proofing, and approximately thirty minutes of proofing in proofers 40a and 40b.

Furthermore, although a particular embodiment has been illustrated, it should be understood that system 10 contemplates that the number of proofers, the way in which pans 100 travel through proofers 40a and 40b, the conditions inside proofers 40a and 40b, and the proofing time may all be varied. For example, although two proofers 40a and 40b are illustrated, a single proofer 40 may also be used. In such a case, the height of proofer 40 might be increased to approximately equal the, total height of proofers 40a and 40b, or the speed at which pans 100 travel through proofer 40 might be reduced.

Once each pan 100 leaves proofer 40b, it is conveyed to a lidding apparatus 50. In the illustrated embodiment, a plurality of lid assemblies 200 enter the top of lidding apparatus 50 and are moved downward by a lowering mechanism 52. Simultaneously, pans 100 move under lowering mechanism 52 such that when an individual lid assembly 200 reaches the bottom of lowering mechanism 52, a pan 100 is positioned directly under and aligned with lid assembly 200. At this point, lowering mechanism 52 positions lid assembly 200 on top of corresponding pan 100. When lid assembly 200 is so positioned, a plurality of lids of lid assembly 200 are aligned with and rest on top of corresponding dough portions 30 positioned in recesses 110 of pan 100. The interaction of lid assemblies 200 and pans 100 is discussed in further detail in conjunction with FIG. 2. It will be understood that other suitable methods of positioning lid assemblies 200 on top of pans 100 may be used in conjunction with system 10. For example, the "lidding" step may be performed manually, instead of by a machine.

Referring now to FIG. 1C, after leaving lidding apparatus 50, pan 100, with lid assembly 200 and corresponding dough portions 30, is conveyed to an oven 60. Oven 60 par-bakes proofed dough portions 30. Par-baking is a process by which oven 60 partially bakes dough portions 30 to form par-baked pizza crusts. Oven 60 is maintained at temperature of approximately three hundred fifty to seven hundred degrees Fahrenheit, and dough portions 30 are par-baked in oven 60 for a period of approximately three to five minutes. While dough portions 30 are in oven 60, the corresponding lids 210 of lid assembly 200 interact with dough portions 30 to provide several functions. These functions are described in conjunction with FIG. 3.

After pans 100 leave oven 60, they are conveyed to a delidding apparatus 70. Delidding apparatus 70 operates in a similar fashion to lidding of apparatus 50. A delidding mechanism 72 lifts lid assembly 200 off of pan 100, and moves lid assembly 200 to the top of delidding apparatus 70. At this point, a conveyor may transfer lid assembly 200 back to lidding apparatus 50 for reuse. It will be understood that any suitable method may be utilized in conjunction with system 10 for removing lid assemblies 100 from pans 200. For example, as with the lidding operation, the delidding function may be performed manually.

After delidding mechanism 70 removes the lid assembly 200 from each pan 100, pans 100 leave delidding apparatus 70. At this point, par-baked pizza crusts 62 are removed from pan 100. A conveyor may then transport each pan 100 back to oiler 35 to be re-oiled and used again in the par-baking process. After removal from pan 100, par-baked pizza crusts 62 are refrigerated or frozen, packaged, and shipped for use.

FIG. 2 illustrates an isometric view of pan 100 and corresponding lid assembly 200. Pan 100 includes a plurality of recesses 110 that correspond in shape to dough portions 30. Recesses 110 may be stamp or pressed into pan 100 if pan 100 is made of metal. Although pan 100 is shown in FIG. 2 with six recesses 110, any number of recesses 110 may be used. The number of recesses 110 is only limited by the size and configuration of the various elements of the par-baking system in which pans 100 are used. For example, for use in system 10, the number of recesses 110 located across the width of pan 100 should equal the number of cutting forms 29 located across the width of cutter drum 27. Furthermore, the size of pan 100 is limited by the size of the elements of system 10, such as lidding apparatus 50, delidding apparatus 70, and proofers 40a and 40b.

The shape of pan 100 may be rectangular, square, circular, or any other shape in which recesses 110 can be disposed. Pan 100 may be made out of a metal, such as aluminum, however, any other suitable baking materials may be used, such as ceramics or glass. If pan 100 is made of metal, recesses 110 may be stamped or pressed into the metal. However, in alternate embodiments, pan 100 may not include recesses 110. Pan 100 may simply be a flat sheet upon which dough portions are deposited.

Lid assembly 200 includes a plurality of lids 210 that are mounted to a frame 220 in an array. An array can be any arrangement or organization of lids 210. Lid assembly 200 is constructed such that the number of lids 210 equals the number of recesses 110 in corresponding pan 100. Furthermore, lids 210 are mounted to frame 220 such that when frame 220 is aligned with pan 100, each lid 210 is generally concentric, centered, or aligned with a corresponding recess 110. Lid assembly 200 further includes one or more alignment members 230. Alignment members 230 are constructed to be coupled with a corresponding alignment member 120 of pan 100 when lid assembly 200 and pan 100 are in alignment. In the illustrated embodiment, alignment members 230 comprise locating pins, and alignment members 120 comprise locator holes. Other suitable methods for alignment may be used, such as the use of other types of male/female connectors or alignment of the edges of pan 100 and lid assembly 200.

In a particular embodiment, frame 220 is constructed of a plurality of elongate members 222 and 224. Lids 210 are arranged in rows and columns. For example, in the illustrated embodiment, there are two columns and three rows. Elongate members 222 are disposed along each column of lids 210, and each lid 210 is coupled to an elongate member 222. Elongate members 222 may be coupled to lids 210 through the use of rivets, welding or other appropriate fastening techniques. Additional elongate members 222 may run parallel to, but not coupled to, the columns of lids 210. Such additional elongate members 222 provide additional structural rigidity and weight.

Elongate members 224 are disposed along each row of lids 210. Each elongate member 224 is coupled to elongate members 222 at the points at which they cross by welding or another appropriate fastening method. Elongate members 224 may also be coupled directly to lids 210. Furthermore, frame 220 may have any configuration that allows for the positioning of lids 210 in an array. Therefore, elongate members 222 and 224 need not be used. For instance, frame 220 might be a unitary sheet of material, such as metal, having lids 210 coupled to it at appropriate points. Such a sheet of metal might alternatively have lids 210 stamped into the metal, as recesses 110 are stamped in particular embodiments of pan 100. Alternatively, if only a single row or column of lids 210 is utilized, frame 220 might include only a single metal bar or rod.

Lid assembly 200 further includes a pair of ledges 240 located on opposite sides of frame 220. Lidding apparatus 50 and delidding apparatus 70 may use ledges 240 in order to lift, lower, or otherwise manipulate lid assembly 200. Ledges 240 may be made from a metal, such as aluminum, however, other suitable materials may be used.

Each lid 210 of lid assembly 200 includes a generally flat central portion 214. A plurality of apertures 212 extend through central portion 214. Each lid 210 also includes a flange 216 that extends upwardly and outwardly from central portion 214. The functions of central portion 214, apertures 212 and flange 216 will be discussed below in conjunction with FIG. 3. Each lid 210 also includes a lip 218 that extends outwardly from flange 216. Lip 218 provides a flat surface on which to mount lids 210 to frame 220. The various elements of lid 210 may be formed from a metal, such as aluminum, however, other suitable materials may be used, such as ceramics, glass, or other suitable materials. Central portion 214, flange 216 and lip 218 may be formed out of a single piece of material that is formed to create these various elements. It should be noted that the material used to fabricate lid 210 can be used to control the heat transfer to the dough discs. For example, one advantage of using a metal, such as aluminum, is that the metal acts as a thermal conductor to give the upper surface of the crust a crispy texture desired by some consumers. However, materials with a higher thermal resistance, or multiple layers of metal having an insulating layer of air between the metal layers, may be used to reduce the amount of heat that reaches the crust during par-baking.

Figure 3:
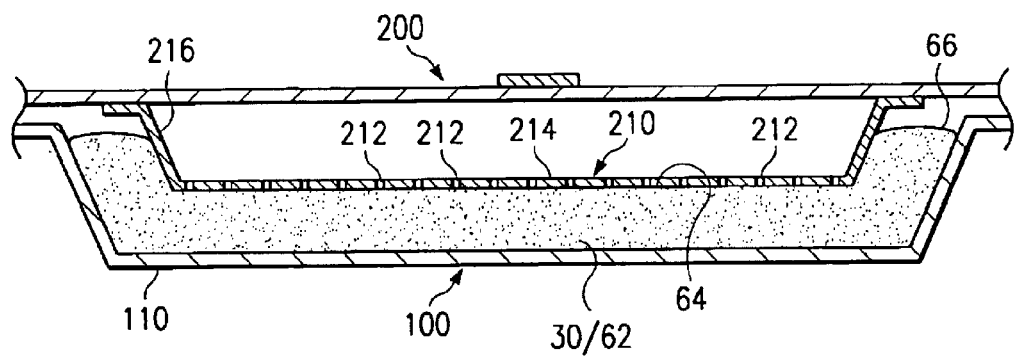
FIG. 3 is a schematic diagram in section with parts broken away showing a pizza dough portion positioned between a lid assembly and a pan according to teachings of the present invention.
Figure 4:
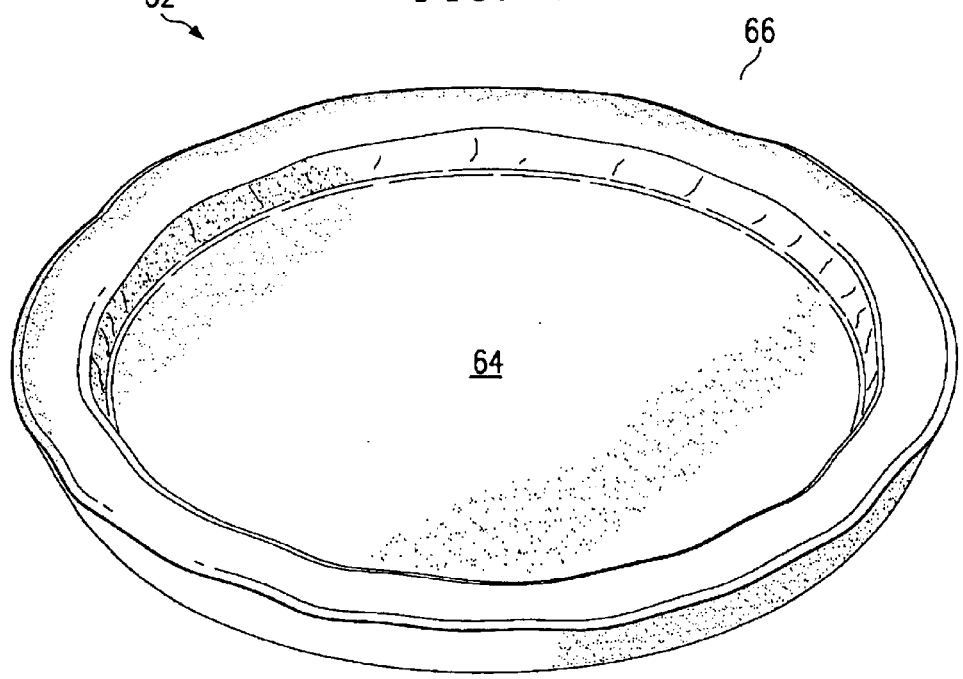
FIG. 4 is a schematic diagram showing a pizza crust par-baked according to teachings of the present invention.

FIG. 3 is a schematic diagram illustrating the configuration of dough portion 30 as it is positioned between recess 110 of pan 100 and lid 210 of lid assembly 200 during par-baking in oven 60. Dough portion 30 is shown in the process of being par-baked into pizza crust 62. Lid assembly 200 performs several functions in forming pizza crust 62. First, lid assembly 200 forms dough portion 30 into the desired shape of pizza crust 62 through compression. Due to the overall weight of lid assembly 200, lid 210 compresses dough portion 30 when it is placed over dough portion 30. In the illustrated embodiment, lid 210 includes central portion 214 and flange 216, that extends upwardly and outwardly from the perimeter of central portion 214. As lid 210 presses into dough portion 30, central portion 214 forms a generally flat topping area 64 in the center of pizza crust 62. Because the size of central portion 214 is smaller than the size of recess 110 that contains dough portion 30, central portion 214 forms a raised rim 66 around topping area 64 of dough portion 30. In addition, the slope of flange 216 helps to shape rim 66. FIG. 4 shows topping area 64 and rim 66 of pizza crust 62 after it has been par-baked in oven 60.

Furthermore, due to the weight of lid assembly 200, gases produced by dough portion 30 during par-baking cannot move or tilt lid assembly 210 so as the create a non-uniform crust 62. Instead, as gases are produced by dough portion 30 during par-baking, such gases pass through apertures 212 of lid 210. This particular function of lid 210 prevents large gas "bubbles" from forming and being baked into pizza crust 62.

Another function of lid 210 is to control the amount of heat and moisture transferred to and from dough portion 30. The material from which lid 210 is fabricated controls the amount of heat transfer to and from dough portion 30. Lid 210 may be made from aluminum, which has a high thermal conductivity. Specifically, aluminum has a higher thermal conductivity than air. Therefore, oven 60 transfers more heat to dough portion 30 during par-baking than would be transferred to dough portion 30 without the presence of lid 210. The number and size of apertures 212 in lid 210 control the amount of moisture allowed to evaporate from dough portion 30. Moisture is allowed to escape in order to properly cook dough portion 30. In addition, as described above, apertures 212 also allow the escape of gases, such as carbon dioxide, from dough portion 30.

Figure 5:
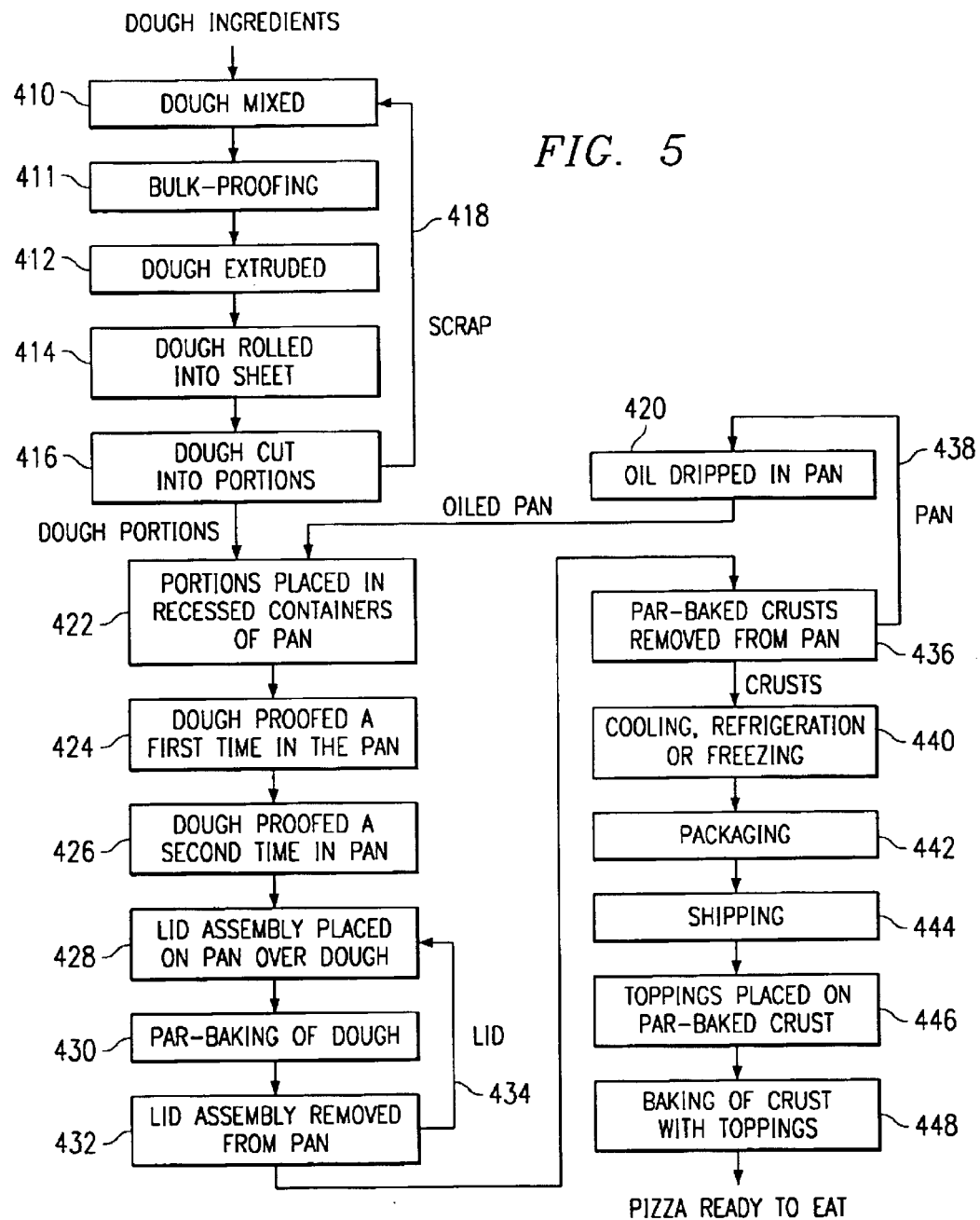
FIG. 5 is a flow chart illustrating a method of par-baking a pizza crust according to teachings of the present invention.

Referring now to FIG. 5, a flow chart illustrating a method of par-baking pizza crusts is shown. The method begins at a step 410 where dough ingredients are placed into mixer 15 and combined to form pizza dough. The dough is then extruded from mixer 15 at step 412, and sheeter 20 rolls the dough into a sheet at step 414. Next, cutter 25 cuts dough portions 30 out of the dough sheets at step 416. A conveyor 40 returns dough webbing 44 to mixer 15 for reuse at step 418.

An oiler 35 deposits a layer of oil into the bottom of recesses 110 in pan 100 at step 420. Conveyer 42 deposits cut dough portions 30 into recesses 110 of pan 100 at step 422. Pan 100 containing dough portions 30 then enters proofer 40a, which proofs dough portions 30 a first time at step 424. This process may be repeated in proofer 40b at step 426. Once proofers 40a and 40b have proofed dough portions 30, lidding apparatus 50 places lid assembly 200 over pan 100 and dough portions 30 at step 428. Lidding apparatus 50 positions lid assembly 200 such that each lid 210 is in contact with a corresponding dough portion 30. Pan 100 and its lid assembly 200 then enter oven 60, and oven 60 par-bakes dough portions 30 at step 430.

After oven 60 par-bakes dough portions 30 to produce par-baked pizza crusts 62, and pan 100 has exited oven 60, delidding apparatus 70 removes lid assembly 200 from pan 100 at step 432. A conveyor returns lid assembly 200 to lidding apparatus 50 for reuse at step 434. Par-baked pizza crusts 62 are removed from pan 100 at step 436, and a conveyor returns pan 100 to oiler 35 for reuse at step 438.

Par-baked crusts 62 are cooled to room temperature, refrigerated, or frozen at step 440. Freezing may be accomplished by placing crusts 62 in a spiral freezer. The cooled or frozen crusts 62 are packaged individually or in groups, as needed, at step 442. Packaged pizza crusts 62 are shipped to an end user at step 444. Typically, this end user will be a restaurant that serves pizzas, however, the end user may be an individual consumer. The end user removes pizza crust 62 from the packaging, and places one or more toppings on crust 62 at step 446. The end user bakes par-baked pizza crust 62 with the toppings to form a completed pizza that is ready to eat at step 448. Because oven 60 par-bakes pizza crust 62 at step 430, the duration of the baking time at step 448 is decreased from that of the traditional baking time of a pizza baked in one step. Furthermore, par-baking pizza crusts 62 produces cost savings in equipment and labor due to the centralized and automated nature of system 10. Moreover, the placement of lid assembly 200 over dough portions 30 in oven 60, produces crusts 62 that have a consistent and optimal form, texture, and taste.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for producing par-baked pizza crusts, comprising:
   a mixer operable to mix a plurality of ingredients to produce pizza crust dough;
   a sheeter operable to form the dough into a sheet;

a cutter operable to cut a plurality of dough portions out of the sheet;

a pan adapted to support a plurality of dough portions, the pan comprising a plurality of recesses, each recess adapted to receive a corresponding dough portion;

a proofer through which the pan travels to proof the dough portions;

a lid assembly positioned over the dough portions after the pan exits the proofer, the lid assembly comprising:
   a frame comprising a plurality of elongate members; and
   a plurality of lids mounted to the elongate members in an array, each lid being substantially separated from each other lid and corresponding to an associated recess of the pan; and a first oven operable to par-bake the dough portions while the lid assembly is positioned over the dough portions to produce par-baked pizza crusts.

2. The system of claim 1, further comprising an oiler operable to deposit a layer of oil in the bottom of each recess of the pan before the dough portions are received in the recesses, the layer of oil contributing to the production of a bottom fried surface of the par-baked pizza crusts.

3. The system of claim 1, further comprising a lidding apparatus operable to position the lid assembly over the dough portions.

4. The system of claim 1, further comprising a delidding apparatus operable to remove the lid assembly from over the dough portions.

5. The system of claim 1, further comprising:
   a first conveyor operable to convey the lid assembly for reuse after the dough portions have been par-baked; and
   a second conveyor operable to convey the pan for reuse after the dough portions have been par-baked.

6. The system of claim 1, further comprising a second oven located remotely from the first oven, the second oven operable to produce a pizza for consumption by baking a par-baked pizza crust having a pizza topping.

7. The system of claim 1, wherein the lid assembly is of sufficient weight such that the lids compress the dough portions as the dough portions rise.

8. The system of claim 1, wherein the lids of the lid assembly include a plurality of apertures formed in the lids.

9. A system for producing par-baked pizza crusts, comprising:

a pan adapted to support a plurality of dough portions, the pan comprising a plurality of recesses, each recess adapted to receive a corresponding dough portion;

a lid assembly positioned such that it contacts each dough portion, the lid assembly comprising:
   a frame comprising a plurality of elongate members; and
   a plurality of lids mounted to the elongate members in an array, each lid being substantially separated from each other lid, each lid corresponding to an associated recess of the pan, each lid contacting a corresponding dough portion; wherein the lid assembly further comprises a frame comprising a plurality of elongate members, the plurality of lids mounted to the frame in an array, each lid corresponding to an associated recess of the pan, each lid contacting a corresponding dough portion in the recess of the pan; and an oven operable to par-bake the dough portions while the lid assembly contacts the dough portions to produce par-baked pizza crusts.

10. The system of claim 9, further comprising an oiler operable to deposit a layer of oil in the bottom of each recess of the pan before the dough portions are received in the recesses, the layer of oil contributing to the production of a bottom fried surface of the par-baked pizza crusts.

11. The system of claim 9, further comprising:
   a mixer operable to mix a plurality of ingredients to produce pizza crust dough;
   a sheeter operable to form the dough into a sheet; and
   a cutter operable to cut the dough portions out of the sheet.

12. The system of claim 9, further comprising a proofer through which the pan travels for more than forty-five minutes to proof the dough portions before the lid assembly is positioned to contact the dough portions.

13. The system of claim 9, further comprising a lidding apparatus operable to position the lid assembly to contact the dough portions.

14. The system of claim 9, further comprising a delidding apparatus operable to remove the lid assembly from contact with the dough portions.

15. The system of claim 9, further comprising:
   a first conveyor operable to convey the lid assembly for reuse after the dough portions have been par-baked; and
   a second conveyor operable to convey the pan for reuse after the dough portions have been par-baked.

16. The system of claim 9, wherein the lid assembly is of sufficient weight such that the lids compress the dough portions as the dough portions rise.

17. The system of claim 9, wherein the lids of the lid assembly include a plurality of apertures formed in the lids.

* * * * *